(12) United States Patent
Chang et al.

(10) Patent No.: US 10,905,186 B2
(45) Date of Patent: Feb. 2, 2021

(54) HEAD-MOUNTED DISPLAY DEVICE

(71) Applicant: HTC Corporation, Taoyuan (TW)

(72) Inventors: Li-Hsun Chang, Taoyuan (TW);
Kuan-Ying Ou, Taoyuan (TW)

(73) Assignee: HTC Corporation, Taoyuan (TW)

(*) Notice: Subject to any disclaimer, the term of this patent is extended or adjusted under 35 U.S.C. 154(b) by 159 days.

(21) Appl. No.: 16/198,776

(22) Filed: Nov. 22, 2018

(65) Prior Publication Data
US 2019/0339736 A1 Nov. 7, 2019

Related U.S. Application Data

(60) Provisional application No. 62/666,098, filed on May 3, 2018.

(51) Int. Cl.
*A42B 3/14* (2006.01)
*A41B 3/08* (2006.01)
(Continued)

(52) U.S. Cl.
CPC .............. *A42B 3/145* (2013.01); *A42B 3/085* (2013.01); *A42B 3/14* (2013.01); *G02B 27/0176* (2013.01); *G06F 1/163* (2013.01)

(58) Field of Classification Search
CPC ........... A42B 3/145; A42B 3/14; A42B 3/142; A42B 3/08; A42B 3/085; G06F 1/163;
(Continued)

(56) References Cited

U.S. PATENT DOCUMENTS 3,787,894 A * 1/1974 Goodman, Jr. ........ A42B 3/145
2/418
5,739,893 A * 4/1998 Karasawa .......... G02B 27/0176
351/158

(Continued)

FOREIGN PATENT DOCUMENTS

CN 204883055 12/2015
CN 200671689 11/2017
(Continued)

OTHER PUBLICATIONS

"Office Action of Taiwan Counterpart Application", dated May 20, 2019, p. 1-p. 3.
(Continued)

*Primary Examiner* — Heather Mangine
(74) *Attorney, Agent, or Firm* — JCIPRNET

(57) ABSTRACT

A head-mounted display device includes a wearable assembly, at least one cushion and at least one adjustable fixing assembly. The wearable assembly is adapted to be worn on a head of a user. The at least one cushion is floatingly connected to the wearable assembly and contact the head of the user. The at least one adjustable fixing assembly includes a first positioning structure and a second positioning structure. The first positioning structure is connected to the wearable assembly, and the second positioning structure is connected to the at least one cushion. A structural interference generated between the first positioning structure and the second positioning structure positions the at least one cushion to the wearable assembly.

14 Claims, 15 Drawing Sheets

(51) Int. Cl.
*G02B 27/01* (2006.01)
*A42B 3/08* (2006.01)
*G06F 1/16* (2006.01)

(58) Field of Classification Search
CPC ..... G06F 3/011; G06F 3/012; G02B 27/0176; G02B 27/01; G02B 27/017
USPC .......................................................... 2/422
See application file for complete search history.

(56) References Cited

U.S. PATENT DOCUMENTS

| | | | | |
|---|---|---|---|---|
| 5,767,820 | A * | 6/1998 | Bassett | G02B 27/017 345/7 |
| 5,774,096 | A * | 6/1998 | Usuki | G02B 7/12 345/8 |
| 5,844,656 | A * | 12/1998 | Ronzani | G02B 27/0176 351/158 |
| 6,144,347 | A * | 11/2000 | Mizoguchi | G02B 27/0172 345/8 |
| 6,388,640 | B1 | 5/2002 | Chigira et al. | |
| 6,538,624 | B1 * | 3/2003 | Karasawa | G02B 27/0176 345/8 |
| 6,677,919 | B2 | 1/2004 | Saito | |
| 7,962,972 | B2 | 6/2011 | Nakabayashi et al. | |
| 8,237,626 | B2 * | 8/2012 | Ishino | G02B 27/0176 345/8 |
| 9,989,998 | B1 * | 6/2018 | Yee | G06F 1/163 |
| 2002/0118506 | A1 | 8/2002 | Saito | |
| 2005/0168812 | A1 * | 8/2005 | Lehrl | G02B 27/0176 359/407 |
| 2006/0070168 | A1 * | 4/2006 | Nakabayashi | G02B 27/0176 2/171 |
| 2007/0013611 | A1 * | 1/2007 | Nakabayashi | G02B 7/002 345/8 |
| 2007/0018908 | A1 * | 1/2007 | Nakabayashi | G02B 27/0176 345/8 |
| 2011/0088148 | A1 * | 4/2011 | Chen | A42B 3/145 2/418 |
| 2013/0335536 | A1 * | 12/2013 | Kura | G02B 27/0176 348/53 |
| 2015/0219901 | A1 * | 8/2015 | Morimoto | G02B 27/017 345/8 |
| 2015/0301594 | A1 * | 10/2015 | Kitazawa | A61B 5/6814 345/156 |
| 2017/0017085 | A1 * | 1/2017 | Araki | G02B 27/0176 |
| 2017/0094816 | A1 * | 3/2017 | Yun | G02B 27/0176 |
| 2017/0123451 | A1 * | 5/2017 | Baudou | G06F 1/163 |
| 2017/0153672 | A1 * | 6/2017 | Shin | G06F 1/169 |
| 2017/0205846 | A1 * | 7/2017 | Nagata | G06F 1/163 |
| 2017/0248990 | A1 * | 8/2017 | Chen | G02B 27/0176 |
| 2017/0337737 | A1 * | 11/2017 | Edwards | F16M 13/04 |
| 2018/0011326 | A1 * | 1/2018 | Ishizaki | G02B 27/0172 |
| 2018/0027676 | A1 * | 1/2018 | Araki | H05K 5/0017 361/679.01 |
| 2018/0055202 | A1 * | 3/2018 | Miller | G02B 27/0176 |
| 2018/0059776 | A1 * | 3/2018 | Jiang | G02B 27/0176 |
| 2018/0295733 | A1 * | 10/2018 | Wen | H05K 5/0017 |
| 2018/0338130 | A1 * | 11/2018 | Miller | H04N 13/398 |
| 2018/0364491 | A1 * | 12/2018 | Park | G06F 3/011 |
| 2019/0037715 | A1 * | 1/2019 | Chen | G02B 7/002 |
| 2019/0079301 | A1 * | 3/2019 | Sauers | G02B 27/0176 |
| 2019/0137765 | A1 * | 5/2019 | Chang | G02B 27/0176 |
| 2019/0141847 | A1 * | 5/2019 | Chang | G02B 27/00 |
| 2019/0159354 | A1 * | 5/2019 | Zheng | A42B 1/24 |
| 2019/0196536 | A1 * | 6/2019 | Wang | G06F 1/163 |
| 2019/0265480 | A1 * | 8/2019 | Han | G02B 27/017 |
| 2019/0280416 | A1 * | 9/2019 | Zhang | G06F 1/16 |
| 2019/0339532 | A1 * | 11/2019 | Chang | G02B 27/0176 |
| 2019/0339736 | A1 * | 11/2019 | Chang | G02B 27/0176 |
| 2019/0346682 | A1 * | 11/2019 | Kang | G02B 27/0176 |
| 2020/0050235 | A1 * | 2/2020 | Yoon | G02B 27/01 |
| 2020/0117008 | A1 * | 4/2020 | Kitakami | G06F 3/011 |
| 2020/0159028 | A1 * | 5/2020 | Araki | G02B 27/02 |

FOREIGN PATENT DOCUMENTS

| | | |
|---|---|---|
| CN | 207123661 | 3/2018 |
| JP | H11119148 | 4/1999 |
| TW | M515653 | 1/2016 |

OTHER PUBLICATIONS

"Search Report of Europe Counterpart Application", dated Aug. 30, 2019, p. 1-p. 4.
"Office Action of Europe Counterpart Application," dated Sep. 12, 2019, p. 1-p. 6.

* cited by examiner

HEAD-MOUNTED DISPLAY DEVICE

CROSS-REFERENCE TO RELATED APPLICATION

This application claims the priority benefit of U.S. provisional application Ser. No. 62/666,098, filed on May 3, 2018. The entirety of the above-mentioned patent application is hereby incorporated by reference herein and made a part of this specification.

BACKGROUND

Technical Field

The application relates to a head-mounted display device, and particularly relates to a head-mounted display device capable of improving wearing comfort.

Description of Related Art

Along with quick development of science and technology industry, types, functions, and usage of display devices are becoming more diverse, and wearable display devices that may be directly attached to the user's body are also developed. There are quite a lot of types of head-mounted display devices, and taking an eyemask type head-mounted display device as an example, after a user wears such type of the display device, besides that the user may view three-dimensional images, the images may be changed along with turning of user's head, which provides the user with a more immersive experience.

However, some users may feel uncomfortable after wearing most of the head-mounted display devices on the market, because most of the head-mounted display devices on the market have headband and cushion designs that are not suitable for head shapes of these users. Therefore, how to make the head-mounted display device more stably worn on the user's head while also providing a more comfortable use experience to the user is a very important subject in the field.

SUMMARY

The application is directed to a head-mounted display device, which is capable of matching with head shapes of different users, such that the users can more stably wear the head-mounted display device to improve wearing comfort of the user.

The application provides a head-mounted display device including a wearable assembly, at least one cushion and at least one adjustable fixing assembly. The wearable assembly is adapted to be worn on a head of a user. The at least one cushion is adapted to contact the head of the user, and is floatingly connected to the wearable assembly. The at least one adjustable fixing assembly includes a first positioning structure and a second positioning structure. The first positioning structure is connected to the wearable assembly, and the second positioning structure is connected to the at least one cushion. A structural interference generated between the first positioning structure and the second positioning structure positions the at least one cushion to the wearable assembly.

Based on the above description, in the head-mounted display device of the application, the wearable assembly is adapted to be worn on the head of the user, the at least one cushion is floatingly connected to the wearable assembly, and is adapted to contact the head of the user when the wearable assembly is worn on the head of the user. The structural interference generated between the first positioning structure and the second positioning structure positions the at least one cushion to the wearable assembly. In this way, the head-mounted display device may be matched to head shapes of different users, such that the users may more stably wear the head-mounted display devices to improve wearing comfort of the user wearing the head-mounted display device.

To make the aforementioned more comprehensible, several embodiments accompanied with drawings are described in detail as follows.

DESCRIPTION OF THE EMBODIMENTS

Figure 1A:
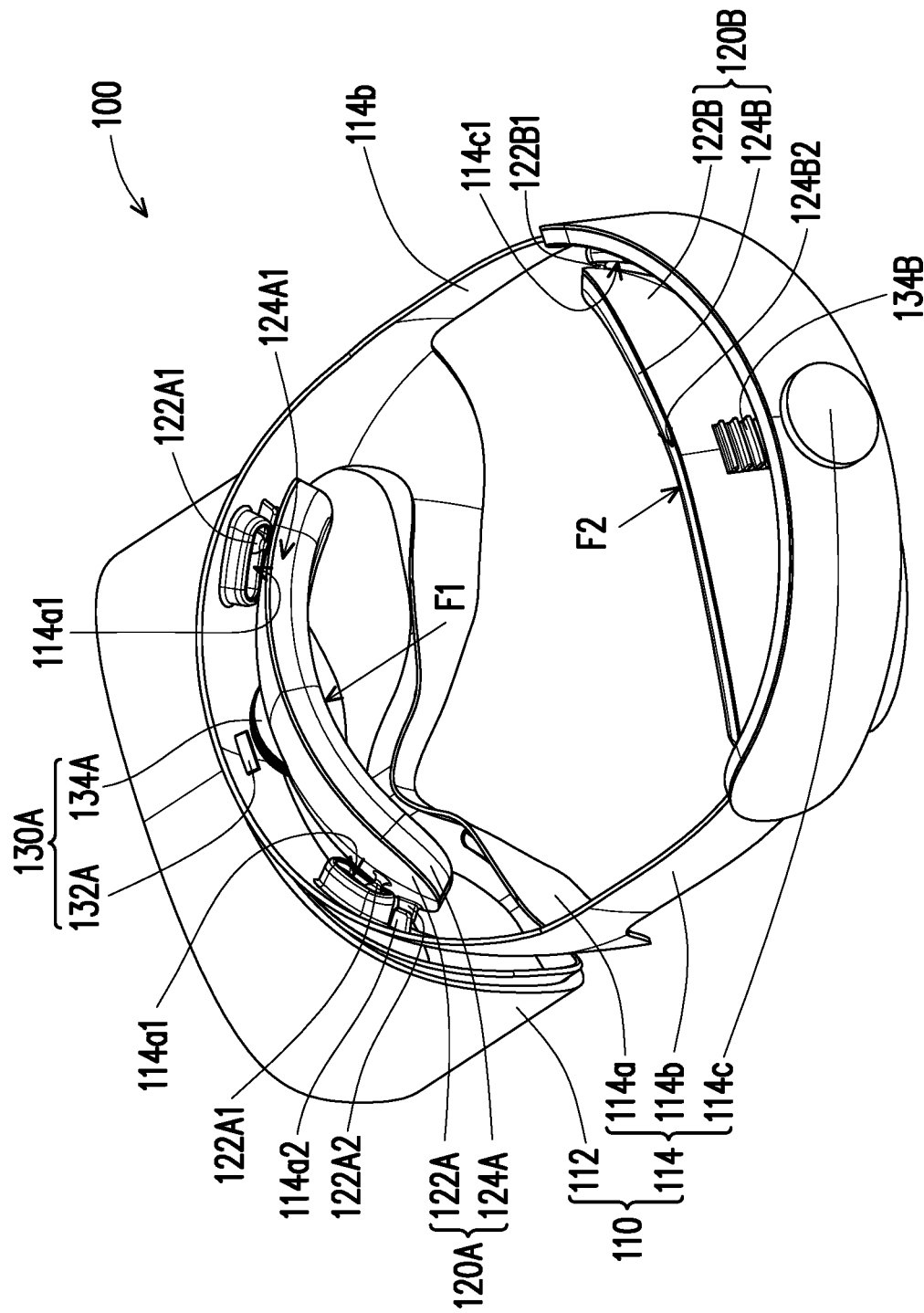
FIG. 1A is a schematic three-dimensional view of a head-mounted display device according to an embodiment of the application.
Figure 1B:
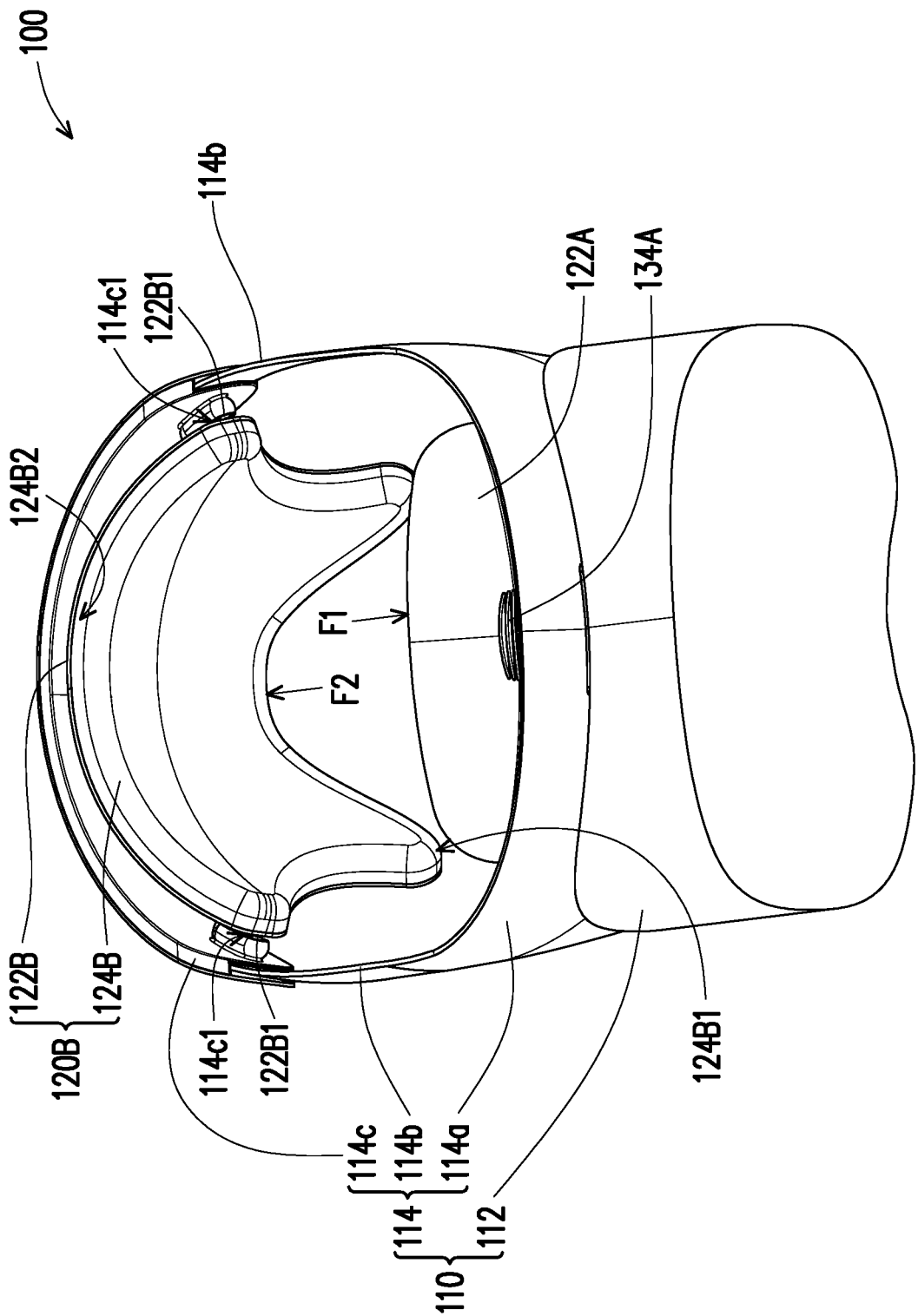
FIG. 1B is a schematic three-dimensional view of the head-mounted display device of FIG. 1A viewing from another viewing angle.

FIG. 1A is a schematic three-dimensional view of a head-mounted display device according to an embodiment of the application. FIG. 1B is a schematic three-dimensional view of the head-mounted display device of FIG. 1A viewing from another viewing angle. Referring to FIG. 1A and FIG. 1B, the head-mounted display device 100 includes a wearable assembly 110, at least one cushion and an adjustable fixing assembly. The at least one cushion (for example, a first cushion 120A and a second cushion 120B of FIG. 3A) is floatingly connected to the wearable assembly 110. The wearable assembly 110 may be worn on a head of a user, and the at least one cushion is adapted to contact the head of the user when the wearable assembly 110 is worn on the head of the user, and the at least one cushion may be positioned to the wearable assembly 110 through the at least one adjustable fixing assembly (for example, a first adjustable fixing assembly 130A and a second adjustable fixing assembly 130B shown in FIG. 3A). In this way, the head-mounted display device 100 may be matched to head shapes of different users, such that the users may more stably wear the head-mounted display device 100 to improve wearing comfort of the user wearing the head-mounted display device 100.

Figure 3A:
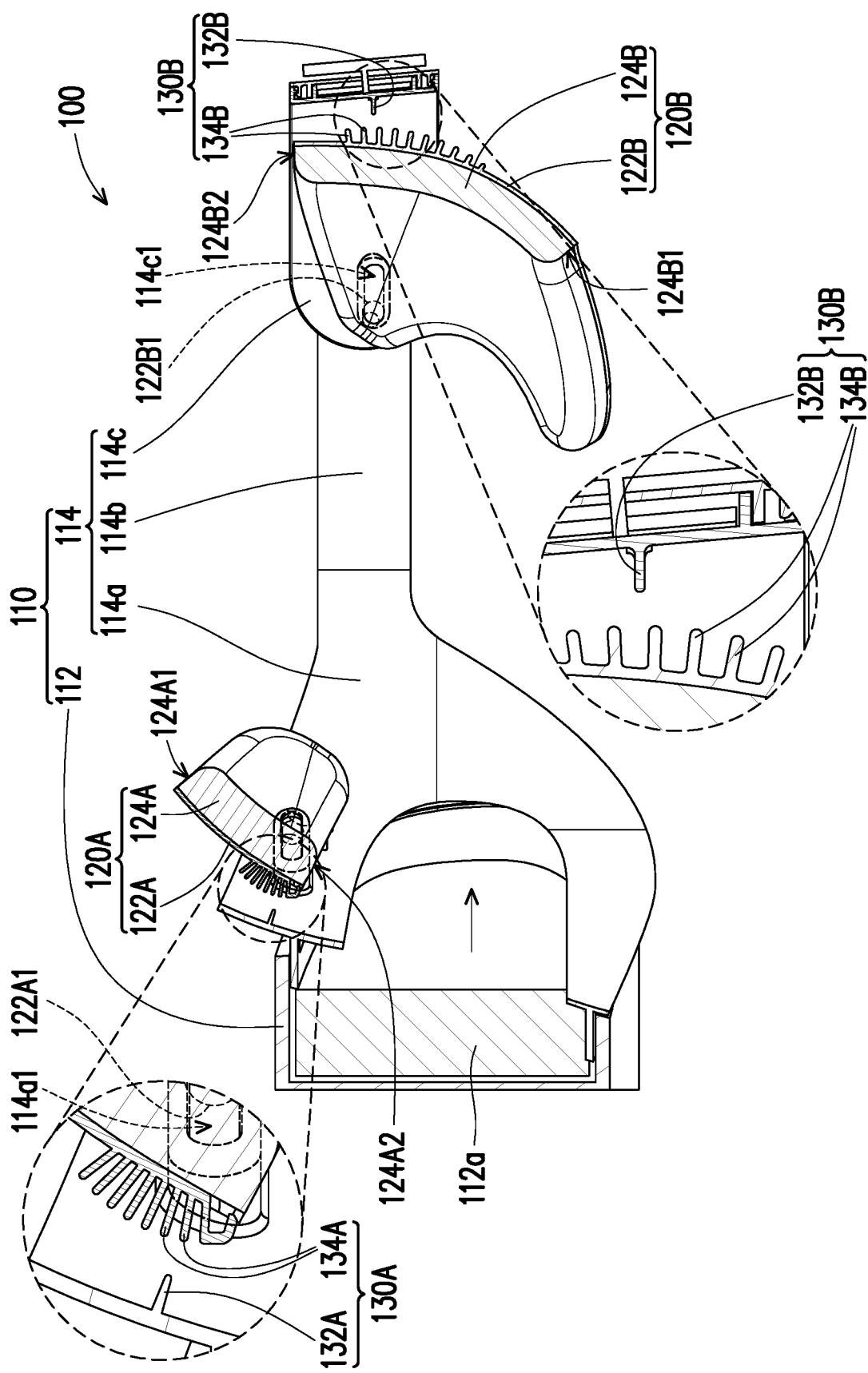
FIG. 3A is a schematic cross-sectional view of cushions of the head-mounted display device of FIG. 1A before being subjected to external forces.

FIG. 3A is a schematic cross-sectional view of the cushions of the head-mounted display device of FIG. 1A before being subjected to external forces. For clarity of representation and convenience of description, first sliding channels 114a1, second sliding channels 114c1, first sliding portions 122A1 and second sliding portions 122B1 are shown by dashed lines in FIG. 3A. Referring to FIG. 1A, FIG. 1B and FIG. 3A, in detail, the wearable assembly 110 includes a main body 112 and a headband assembly 114 connected to the main body 112. A display 112a may be built in or additionally configured to the main body 112. The display 112a may project display images to the eyes of the user when the user wears the headband assembly 114. In detail, the headband assembly 114 includes an eye contact portion 114a, a pair of extension portions 114b respectively connected to two opposite ends of the eye contact portion 114a, and a rotation mechanism 114c coupled to the pair of extension portions 114b. When the user wants to wear the wearable assembly 110 on the head, the user may cover the eye contact portion 114a on the two eyes of the user, and rotates the rotation mechanism 114c to drive the pair of extension portions 114b to tighten or loosen, so as to adjust a total length of the pair of extension portions 114b, and thus the wearable assembly 110 is adapted to be worn on the head of the user.

Figure 2A:
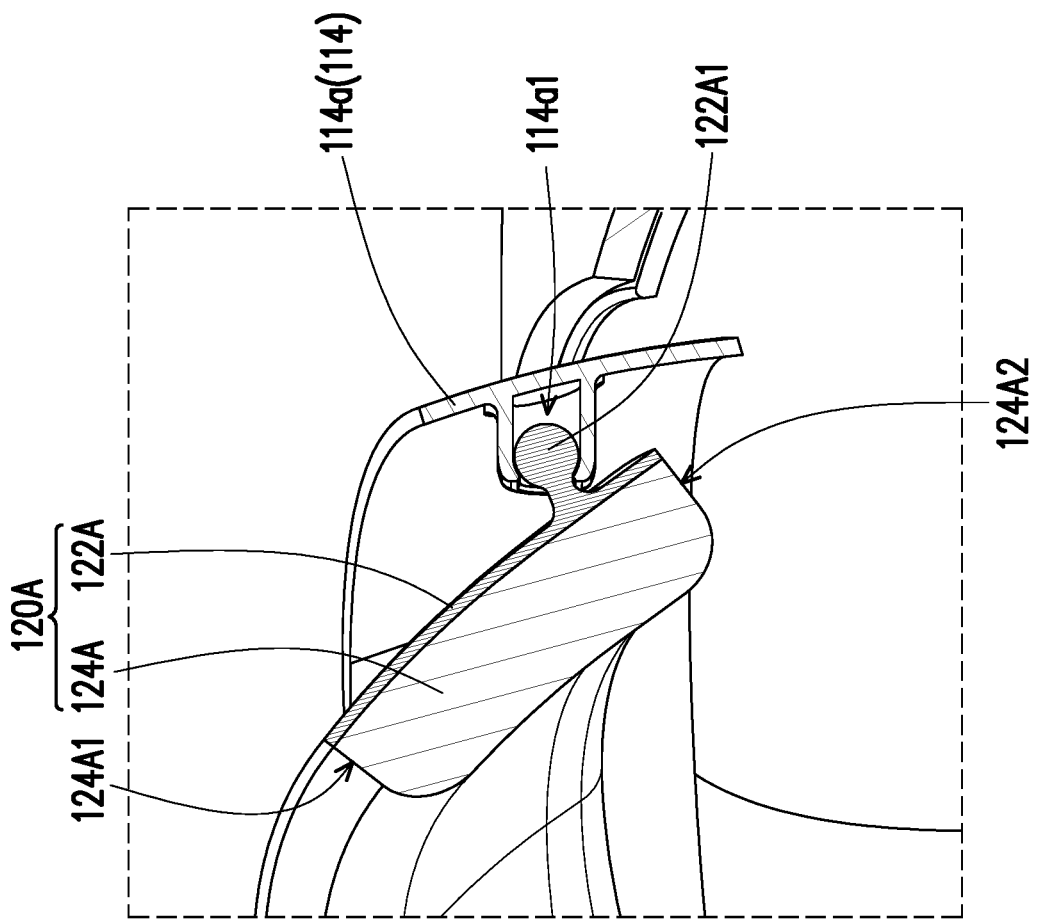
FIG. 2A is a schematic partial cross-sectional view of the head-mounted display device of FIG. 1A.
Figure 2B:
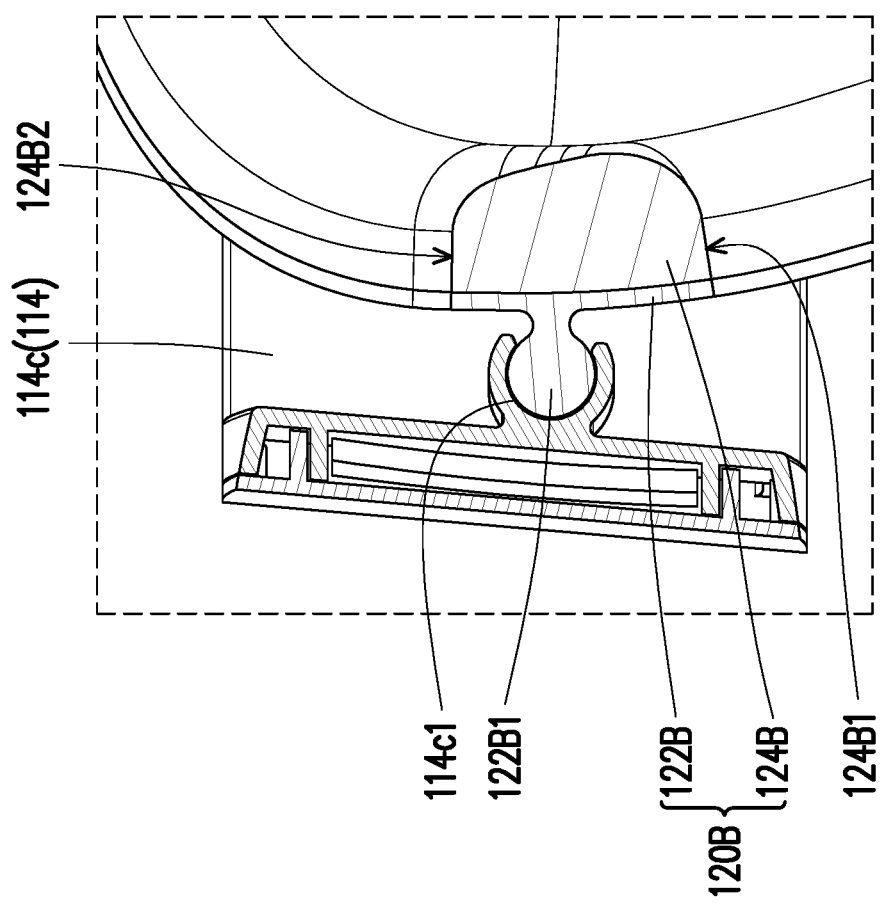
FIG. 2B is a schematic partial cross-sectional view of the head-mounted display device of FIG. 1B.

FIG. 2A is a schematic partial cross-sectional view of the head-mounted display device of FIG. 1A. FIG. 2B is a schematic partial cross-sectional view of the head-mounted display device of FIG. 1B. Referring to FIG. 1A, FIG. 2A and FIG. 3A, the at least one cushion may include the first cushion 120A and the second cushion 120B. The first cushion 120A includes a first support portion 122A made of a rigid material, and a first buffer portion 124A made of a soft material, the first support portion 122A is used for supporting, and the first buffer portion 124A may contact the head of the user to improve comfort of the user wearing the head-mounted display device 100. The first support portion 122A includes a pair of first sliding portions 122A1, and the pair of the first sliding portions 122A1 are respectively connected to two opposite ends of the first support portion 122A. On the other hand, the eye contact portion 114a has a pair of first sliding channels 114a1 corresponding to the pair of first sliding portions 122A1, and the pair of first sliding portions 122A1 are movably disposed in the pair of first sliding channels 114a1, such that the first cushion 120A is floatingly connected to the wearable assembly 110.

Referring to FIG. 1B, FIG. 2B and FIG. 3A, similarly, the second cushion 120B includes a second support portion 122B made of the rigid material, and a second buffer portion 124BA made of the soft material, the second support portion 122B is used for supporting, and the second buffer portion 124B may contact the head of the user to improve comfort of the user wearing the head-mounted display device 100. The second support portion 122B includes a pair of second sliding portions 122B1, and the pair of the second sliding portions 122B1 are respectively connected to two opposite ends of the second support portion 122B. On the other hand, the rotation mechanism 114c has a pair of second sliding channels 114c1 corresponding to the pair of second sliding portions 122B1, and the pair of second sliding portions 122B1 are movably disposed in the pair of second sliding channels 114c1, such that the second cushion 120B is floatingly connected to the wearable assembly 110.

In the embodiment, the first sliding portions 122A1 and the second sliding portions 122B1 are, for example, spherical structures, though in other embodiments, the first sliding portions and the second sliding portions may also be columnar structures, which is not limited here, as long as the first sliding portions 122A1 may be slid and rotated in the first sliding channel 114a1, and the second sliding portions 122B1 may be slid and rotated in the second sliding channel 114c1.

Moreover, the number of the cushions may be increased or decreased according to an actual requirement, and the sliding portions and the sliding channels may also be increased or decreased according to the number of the cushions. On the other hand, the cushions may be disposed at any place of the wearable assembly 110 according to an actual requirement, for example, at least one pair of the sliding channels may be disposed on the eye contact portion 114a, the extension portion 114b or the rotation mechanism 114c, such that the cushions are floatingly connected to the eye contact portion 114a, the extension portion 114b or the rotation mechanism 114c through coordination between the sliding portions and the sliding channels, so as to contact different positions of the user's head. In brief, the wearable assembly 110 may have at least one pair of sliding channels, at least one cushion and at least one pair of sliding portions corresponding to the at least one pair of sliding channels, the pair of sliding portions are located at two opposite ends of the at least one cushion, and the pair of sliding portions are movably disposed in the pair of sliding channels, such that the at least one cushion is floatingly connected to the wearable assembly 110.

Referring to FIG. 1A, FIG. 1B and FIG. 3A, the at least one adjustable fixing assembly may include a first adjustable fixing assembly 130A and a second adjustable fixing assembly 130B. The first adjustable fixing assembly 130A includes a first positioning structure (for example, a first interference portion 132A in FIG. 3A) and a second positioning structure (for example, a second interference portion 134A in FIG. 3A), the first positioning structure is connected to the eye contact portion 114a, and the second positioning structure is connected to the first cushion 120A. The second adjustable fixing assembly 130B includes a third positioning structure (for example, a third interference portion 132B in FIG. 3A) and a fourth positioning structure (for example, a fourth interference portion 134B in FIG. 3A), the third positioning structure is connected to the rotation mechanism 114c, and the fourth positioning structure is connected to the second cushion 120B.

Figure 3B:
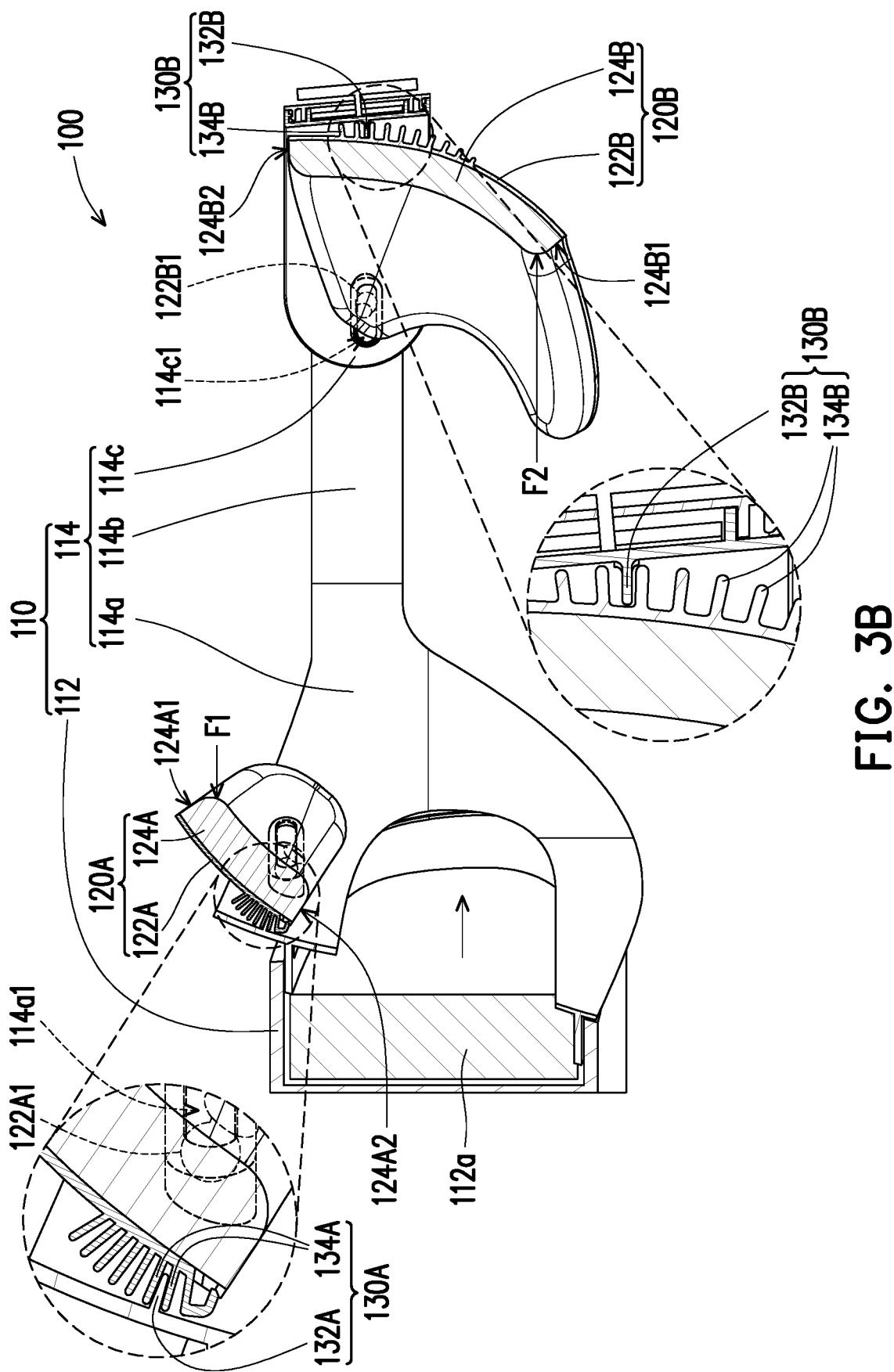
FIG. 3B is a schematic diagram of the cushions of the head-mounted display device of FIG. 3A positioned to a wearable assembly after being subjected to the external forces.

FIG. 3B is a schematic diagram of the cushions of the head-mounted display device of FIG. 3A positioned to the wearable assembly after being subjected to the external forces. For clarity of representation and convenience of description, the first sliding channels 114a1, the second sliding channels 114c1, the first sliding portions 122A1 and the second sliding portions 122B1 are shown by dashed lines in FIG. 3B. Referring to FIG. 3A and FIG. 3B, the first buffer portion 124A of the first cushion 120A has a first upper side 124A1 and a first lower side 124A2 opposite to each other. The second buffer portion 124B of the second cushion 120B has a second lower side 124B1 and a second upper side 124B2 opposite to each other. FIG. 3A illustrates a state that the first cushion 120A is not subjected to a first external force F1, and the second cushion 120B is not subjected to a second external force F2. When the user wears the headband assembly 114 on the head, the first upper side 124A1 of the first cushion 120A may contact a frontal bone of the user, and the second lower side 124B1 of the second cushion 120B may contact an occipital bone of the user.

Thereafter, the user may rotate the rotation mechanism 114c to drive the pair of extension portions 114b to tighten, such that a total length of the pair of extension portions 114b is shortened, and the first cushion 120A is accordingly subjected to the first external force F1, and the second cushion 120B is subjected to the second external force F2.

On the other hand, the first positioning structure includes a first interference portion 132A, and the second positioning structure includes a plurality of second interference portions 134A corresponding to the first interference portion 132A. The third positioning structure includes a third interference portion 132B, and the fourth positioning structure includes a plurality of fourth interference portions 134B corresponding to the third interference portion 132B.

Referring to FIG. 3A and FIG. 3B, FIG. 3B illustrates the first cushion 120A of FIG. 3A subjected to the first external force F1 is only translated towards the eye contact portion 114a without being rotated, and the second cushion 120B subjected to the second external force F2 is only translated towards the rotation mechanism 114c without being rotated. When the first cushion 120A is subjected to the first external force F1 to drive the second positioning structure to move towards the first positioning structure relative to the eye contact portion 114a and the two opposite ends of the first cushion 120A are translated towards each other under the function of the first external force F1 to make the first interference portion 132A to be moved between two adjacent second interference portions 134A to engage with the two adjacent second interference portions 134A, the mutual engagement between the first positioning structure and the second positioning structure positions the first cushion 120A to the wearable assembly 110. When the first positioning structure and the second positioning structure are structurally interfered to position the first cushion 120A to the eye contact portion 114a, the first upper side 124A1 and the first lower side 124A2 of the first cushion 120A contact the frontal bone of the user at the same time, so that the first cushion 120A is matched with a head shape of the user, which avails the user more stably wearing the head-mounted display device 100 on the head, and improving comfort of the user wearing the head-mounted display device 100.

Similarly, when the second cushion 120B is subjected to the second external force F2 to drive the fourth positioning structure to move towards the third positioning structure relative to the rotation mechanism 114c and the two opposite ends of the second cushion 120B are translated towards each other under the function of the second external force F2 to make the third interference portion 132B to be moved between two adjacent fourth interference portions 134B to engage with one of the two adjacent fourth interference portions 134B, the mutual engagement between the third positioning structure and the fourth positioning structure positions the second cushion 120B to the wearable assembly 110. When the third positioning structure and the fourth positioning structure are structurally interfered to position the second cushion 120B to the rotation mechanism 114c, the second lower side 124B1 and the second upper side 124B2 of the second cushion 120B contact the occipital bone of the user at the same time, so that the second cushion 120B is matched with a head shape of the user, which avails the user more stably wearing the head-mounted display device 100 on the head, and improving comfort of the user wearing the head-mounted display device 100.

Figure 4A:
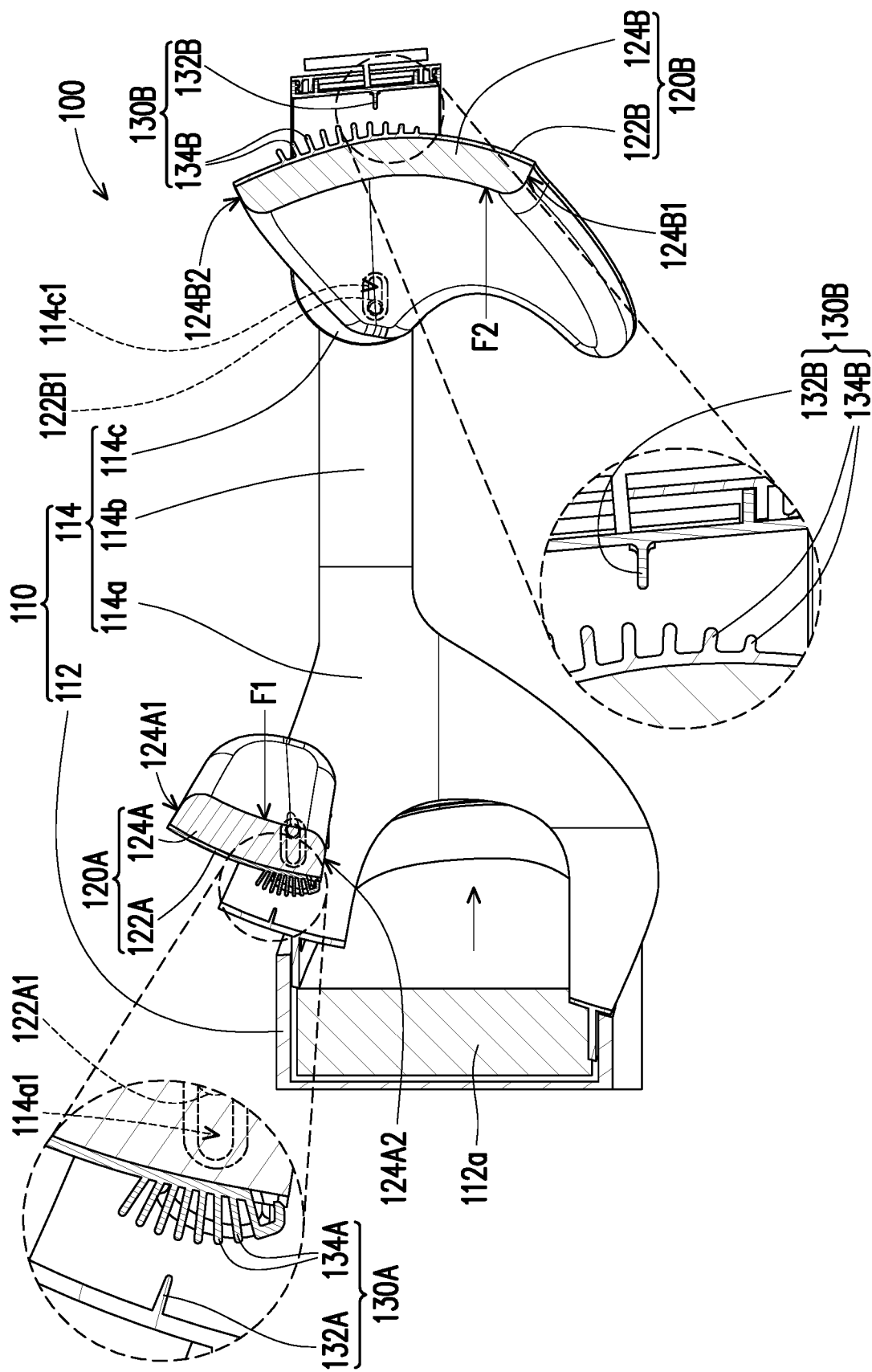
FIG. 4A is a schematic cross-sectional view of the cushions of the head-mounted display device of FIG. 1A rotated relative to the wearable assembly after being subjected to the external force.
Figure 4B:
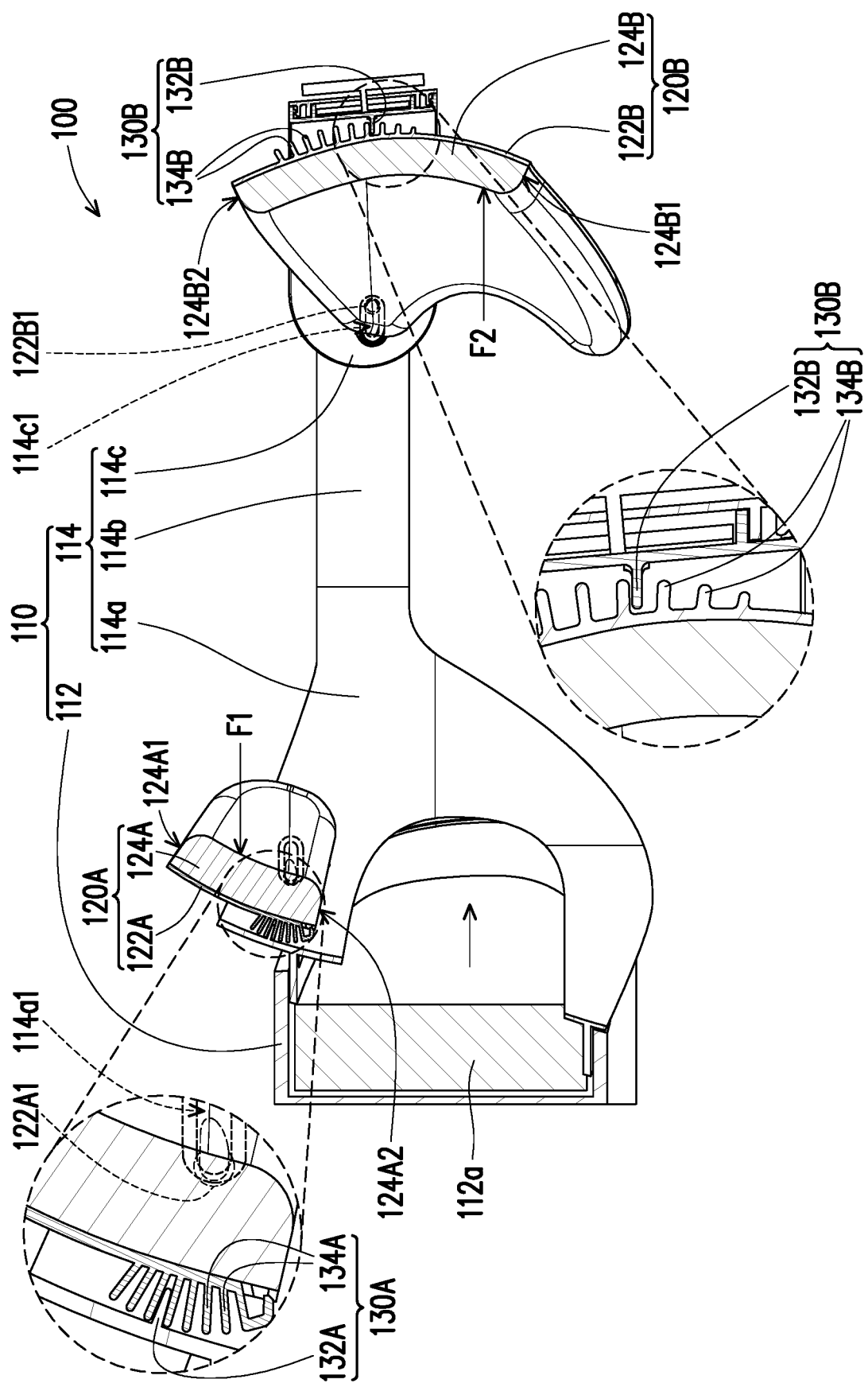
FIG. 4B is a schematic cross-sectional view of the cushions of the head-mounted display device of FIG. 4A positioned to the wearable assembly after being subjected to the external force.

FIG. 4A is a schematic cross-sectional view of the cushions of the head-mounted display device of FIG. 1A rotated relative to the wearable assembly after being subjected to the external force. FIG. 4B is a schematic cross-sectional view of the cushions of the head-mounted display device of FIG. 4A positioned to the wearable assembly after being subjected to the external force. For clarity of representation and convenience of description, the first sliding channels 114a1, the second sliding channels 114c1, the first sliding portions 122A1 and the second sliding portions 122B1 are shown by dashed lines in FIG. 4A and FIG. 4B. Referring to FIG. 4A and FIG. 4B, FIG. 4A illustrates a schematic diagram that the first cushion 120A of FIG. 3A subjected to the first external force F1 is translated towards the eye contact portion 114a and is rotated, and the second cushion 120B subjected to the second external force F2 is translated towards the rotation mechanism 114c and is rotated. When the first cushion 120A is subjected to the first external force F1 to drive the second positioning structure to move towards the first positioning structure relative to the eye contact portion 114a and the two opposite ends of the first cushion 120A are translated towards each other under the function of the first external force F1, and the first cushion 120A is rotated relative to the eye contact portion 114a to make the first interference portion 132A to be moved between two adjacent second interference portions 134A to engage with the two adjacent second interference portions 134A, the mutual engagement between the first positioning structure and the second positioning structure positions the first cushion 120A to the wearable assembly 110. When the first positioning structure and the second positioning structure are structurally interfered to position the first cushion 120A to the eye contact portion 114a, the first upper side 124A1 and the first lower side 124A2 of the first cushion 120A contact the frontal bone of the user at the same time. In other words, when the head-mounted display device 100 is worn on a head of a user with a different head shape, the first cushion 120A may be rotated by a different angle relative to the eye contact portion 114a in response to the head shapes of different users, so that the head-mounted display device 100 may be matched with head shapes of different users, which avails the user more stably wearing the head-mounted display device 100 on the head, and improving comfort of the user wearing the head-mounted display device 100.

Similarly, when the second cushion 120B is subjected to the second external force F2 to drive the fourth positioning structure to move towards the third positioning structure relative to the rotation mechanism 114c and the two opposite ends of the second cushion 120B are translated towards each other under the function of the second external force F2, and the second cushion 120B is rotated relative to the rotation mechanism 114c to make the third interference portion 132B to be moved between two adjacent fourth interference portions 134B to engage with one of the two adjacent fourth interference portions 134B, the mutual engagement between the third positioning structure and the fourth positioning structure positions the second cushion 120B to the wearable assembly 110. When the third positioning structure and the fourth positioning structure are structurally interfered to position the second cushion 120B to the rotation mechanism 114c, the second lower side 124B1 and the second upper side 124B2 of the second cushion 120B contact the occipital bone of the user at the same time. In other word, when the head-mounted display device 100 is worn on a head of a user with a different head shape, the second cushion 120B may be rotated by a different angle relative to the rotation mechanism 114c in response to the head shapes of different users, so that the head-mounted display device 100 may be matched with head shapes of different users, which avails the head-mounted display device 100 can be more stably worn on the heads of different users, and improving comfort of the user wearing the head-mounted display device 100.

In the embodiment, the number and configuration positions of the cushions may be adjusted according to an actual requirement. For example, the head-mounted display device 100 may be only configured with a single first cushion 120A or a single second cushion 120B, or configured with both of the first cushion 120A and the second cushion 120B. In other embodiments, the cushions may be configured on at least one of the eye contact portion 114a, the extension portion 114b and the rotation mechanism 114c to contact different parts of the user's head.

Moreover, the first support portion 122A, the first sliding portion 122A1 and the second interference portion 134A of the second positioning structure are, for example, formed integrally, but may also be assembled from different members in other embodiments. Similarly, the second support portion 122B, the second sliding portion 122B1 and the fourth interference portion 134B of the fourth positioning structure are, for example, formed integrally, but may also be assembled from different members in other embodiments.

On the other hand, referring to FIG. 1A, the eye contact portion 114a includes a first position limiting portion 114a2, the first support portion 122A of the first cushion 120A includes a second position limiting portion 122A2 corresponding to the first position limiting portion 114a2, and the first position limiting portion 114a2 and the second position limiting portion 122A2 are configured to limit rotation of the first cushion 120A relative to the eye contact portion 114a. Moreover, structures the same as the first position limiting portion 114a2 and the second position limiting portion 122A2 may also be configured between the second cushion 120B and the rotation mechanism 114c to limit rotation of the second cushion 120B relative to the rotation mechanism 114c, and details thereof are not repeated.

Figure 5:
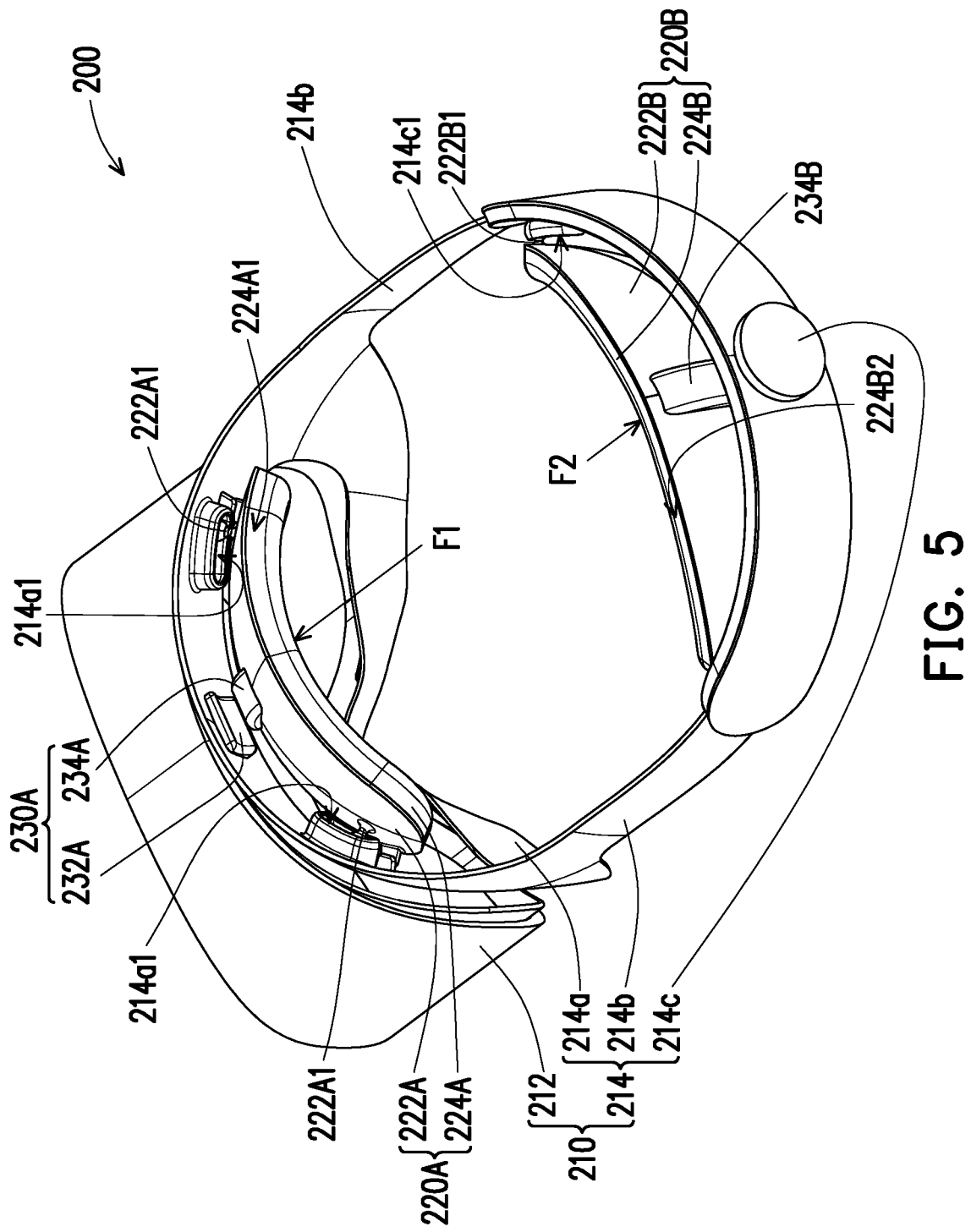
FIG. 5 is a schematic three-dimensional view of a head-mounted display device according to another embodiment of the application.
Figure 6A:
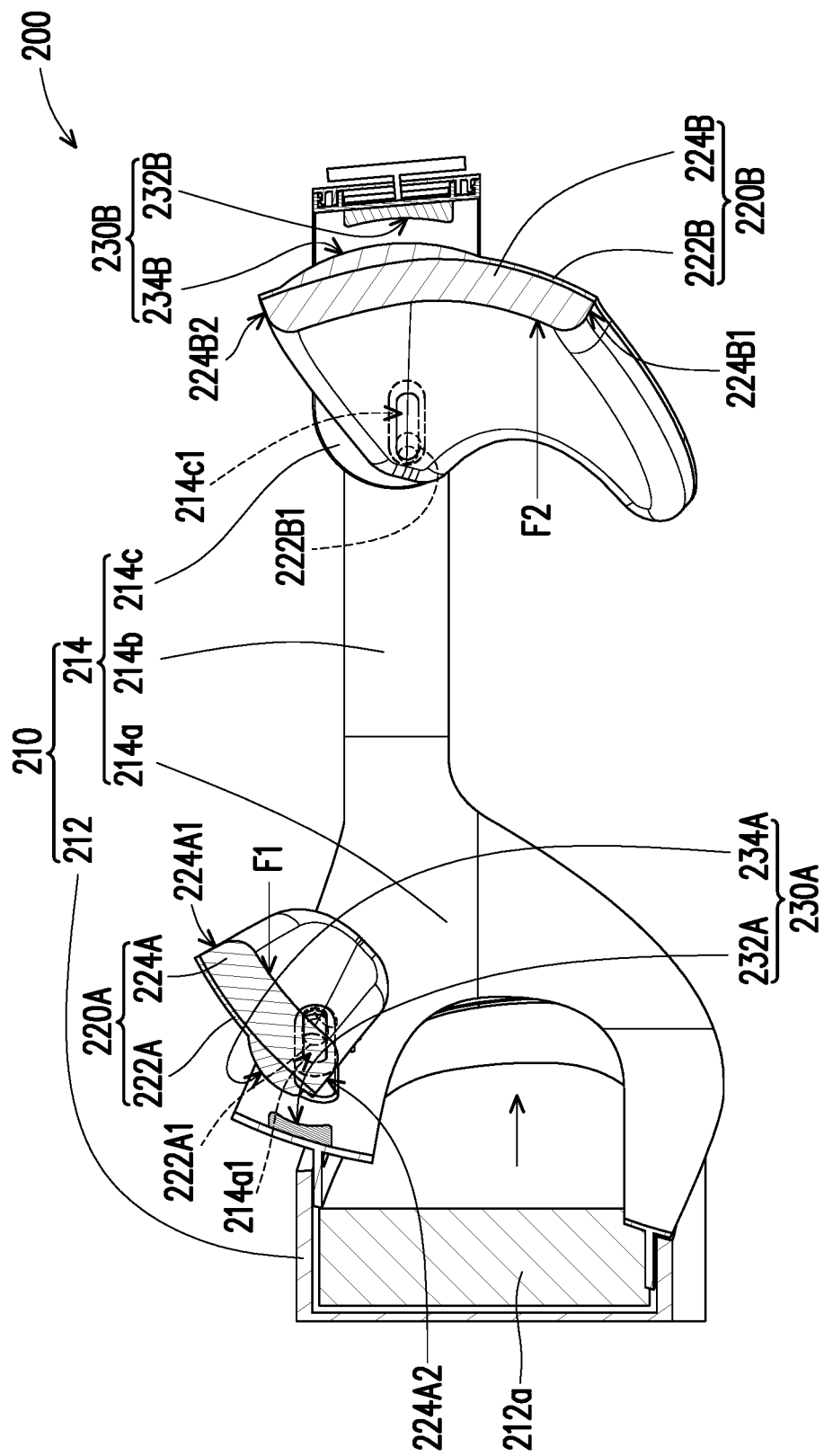
FIG. 6A is a schematic cross-sectional view of cushions of the head-mounted display device of FIG. 5 being not subjected to external forces.
Figure 6B:
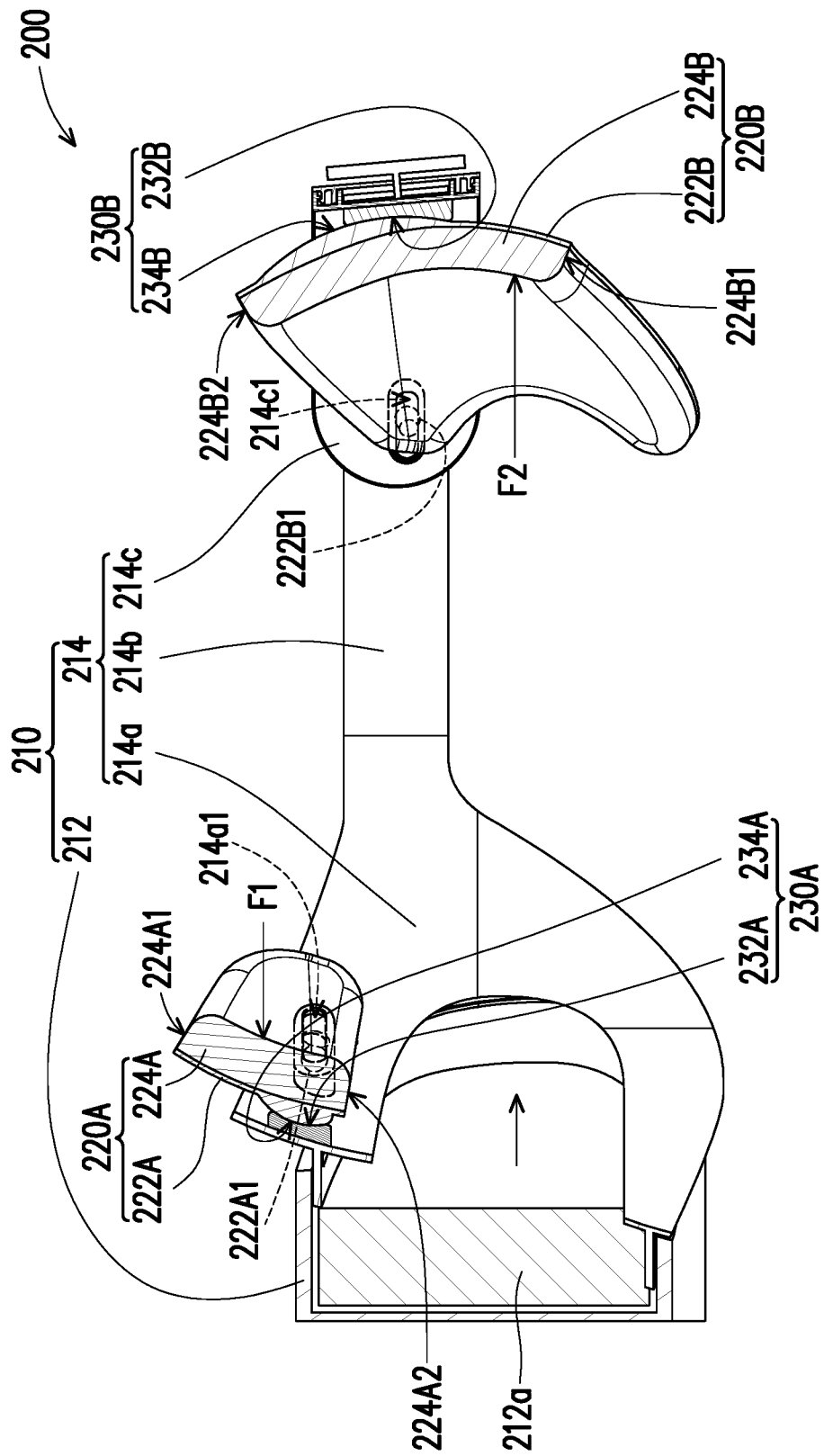
FIG. 6B is a schematic diagram of the cushions of the head-mounted display device of FIG. 6A positioned to the wearable assembly after being subjected to the external forces.

FIG. 5 is a schematic three-dimensional view of a head-mounted display device according to another embodiment of the application. FIG. 6A is a schematic cross-sectional view of cushions of the head-mounted display device of FIG. 5 being not subjected to external forces. FIG. 6B is a schematic diagram of the cushions of the head-mounted display device of FIG. 6A positioned to the wearable assembly after being subjected to the external forces. For clarity of representation and convenience of description, the first sliding channels 214a1, the second sliding channels 214c1, the first sliding portions 222A1 and the second sliding portions 222B1 are shown by dashed lines in FIG. 6A and FIG. 6B. Referring to FIG. 5, FIG. 6A and FIG. 6B, the head-mounted display device 200 includes a wearable assembly 210, a first cushion 220A, a second cushion 220B, a first adjustable fixing assembly 230A and a second adjustable fixing assembly 230B.

In detail, the wearable assembly 210 includes a main body 212 and a headband assembly 214 connected to the main body 212. The headband assembly 214 includes an eye contact portion 214a capable of covering the two eyes of the user, a pair of extension portions 214b respectively connected to two opposite ends of the eye contact portion 214a, and a rotation mechanism 214c coupled to the pair of extension portions 214b, and the rotation mechanism 214c is adapted to rotate and drive the pair of extension portions 214b to tighten or loosen, so as to increase or decrease a total length of the pair of extension portions 214b. A display 212a may be built in or additionally assembled in the main body 212, and the display 212a may project display images to the eyes of the user.

On the other hand, the eye contact portion 214a has a pair of first sliding channels 214a1. The first cushion 220A includes a first support portion 222A and a first buffer portion 224A connected to the first support portion 222A. The first support portion 222A includes a pair of first sliding portions 222A1 corresponding to the pair of first sliding channels 214a1, the pair of first sliding portions 222A1 are movably disposed in the pair of first sliding channels 214a1, and the first sliding portions 222A1 are, for example, spherical structures, but not limited thereto. The first buffer portion 224A is configured to contact the frontal bone of the user, and has a first upper side 224A1 and a first lower side 224A2 opposite to each other.

The rotation mechanism 214c has a pair of second sliding channels 214c1. The second cushion 220B includes a second support portion 222B and a second buffer portion 224B connected to the second support portion 222B. The second support portion 222B includes a pair of second sliding portions 222B1 corresponding to the pair of second sliding channels 214c1, the pair of second sliding portions 222B1 are movably disposed in the pair of second sliding channels 214c1, and the second sliding portions 222B1 are, for example, spherical structures, but not limited thereto. The second buffer portion 224B is configured to contact the occipital bone of the user, and has a second lower side 224B1 and a second upper side 224B2 opposite to each other.

When the headband assembly 214 is worn on the head of the user, the first upper side 224A1 of the first buffer portion 224A contacts the frontal bone of the user, and the second lower side 224B1 of the second buffer portion 224B contacts the occipital bone of the user.

In the embodiment, the first adjustable fixing assembly 230A includes a first positioning structure (for example, a rough surface 232A in FIG. 6A) and a second positioning structure (for example, another rough surface 234A in FIG. 6A), the first positioning structure is connected to the eye contact portion 214a of the headband assembly 214, and the second positioning structure is connected to the first support portion 222A of the first cushion 220A. The first positioning structure includes a rough surface 232A, and the second positioning structure includes another rough surface 234A corresponding to the first positioning structure.

The second adjustable fixing assembly 230B includes a third positioning structure (for example, a rough surface 232B in FIG. 6A) and a fourth positioning structure (for example, another rough surface 234B in FIG. 6A), the third positioning structure is connected to the rotation mechanism 214c of the headband assembly 214, and the fourth positioning structure is connected to the second support portion 222B of the second cushion 220B. The third positioning structure includes a rough surface 232B, and the fourth positioning structure includes another rough surface 234B corresponding to the third positioning structure.

When the first cushion 220A is subjected to the first external force F1 to drive the second positioning structure to move towards the first positioning structure relative to the eye contact portion 214a of the wearable assembly 210 and rotate relative to the eye contact portion 214a of the wearable assembly 210 to make the other rough surface 234A to contact the rough surface 232A, friction generated between the first positioning structure and the second positioning structure positions the first cushion 220A to the eye contact portion 214a of the wearable assembly 210, and the first upper side 224A1 and the first lower side 224A2 of the first cushion 220A contact the frontal bone of the user at the same time. When the second cushion 220B is subjected to the second external force F2 to drive the fourth positioning structure to move towards the third positioning structure relative to the rotation mechanism 214c of the wearable assembly 210 and rotate relative to the rotation mechanism 214c of the wearable assembly 210 to make the other rough surface 234B to contact the rough surface 232B, friction generated between the third positioning structure and the fourth positioning structure positions the second cushion 220B to the rotation mechanism 214c of the wearable assembly 210, and the first lower side 224B1 and the second upper side 224B2 of the second cushion 220B contact the occipital bone of the user at the same time. In this way, the head-mounted display device 200 may be matched with different head shapes of the users, which avails the user more stably wearing the head-mounted display device 200 on the head, and improving comfort of the user wearing the head-mounted display device 200.

Figure 7A:
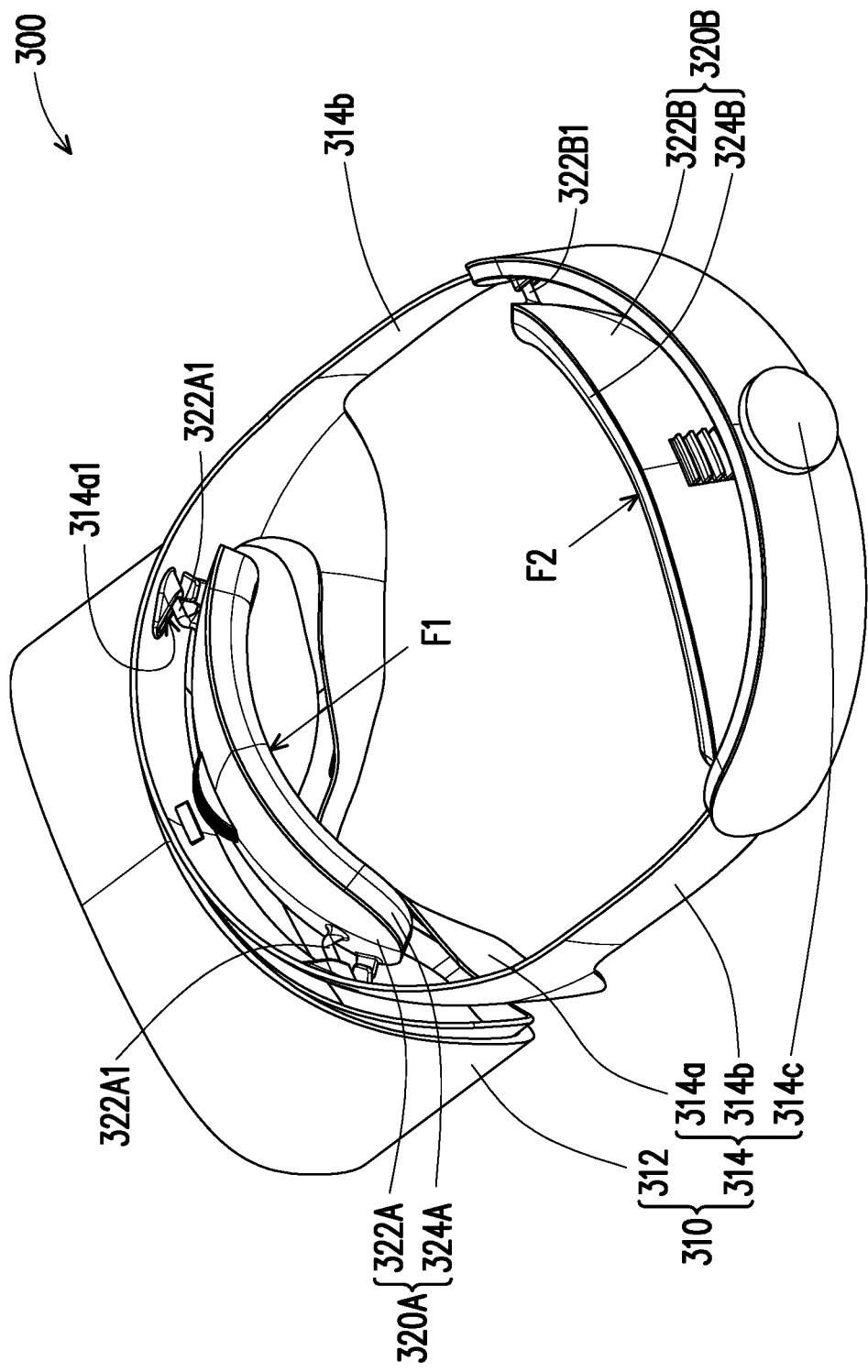
FIG. 7A is a schematic three-dimensional view of a head-mounted display device according to another embodiment of the application.
Figure 7B:
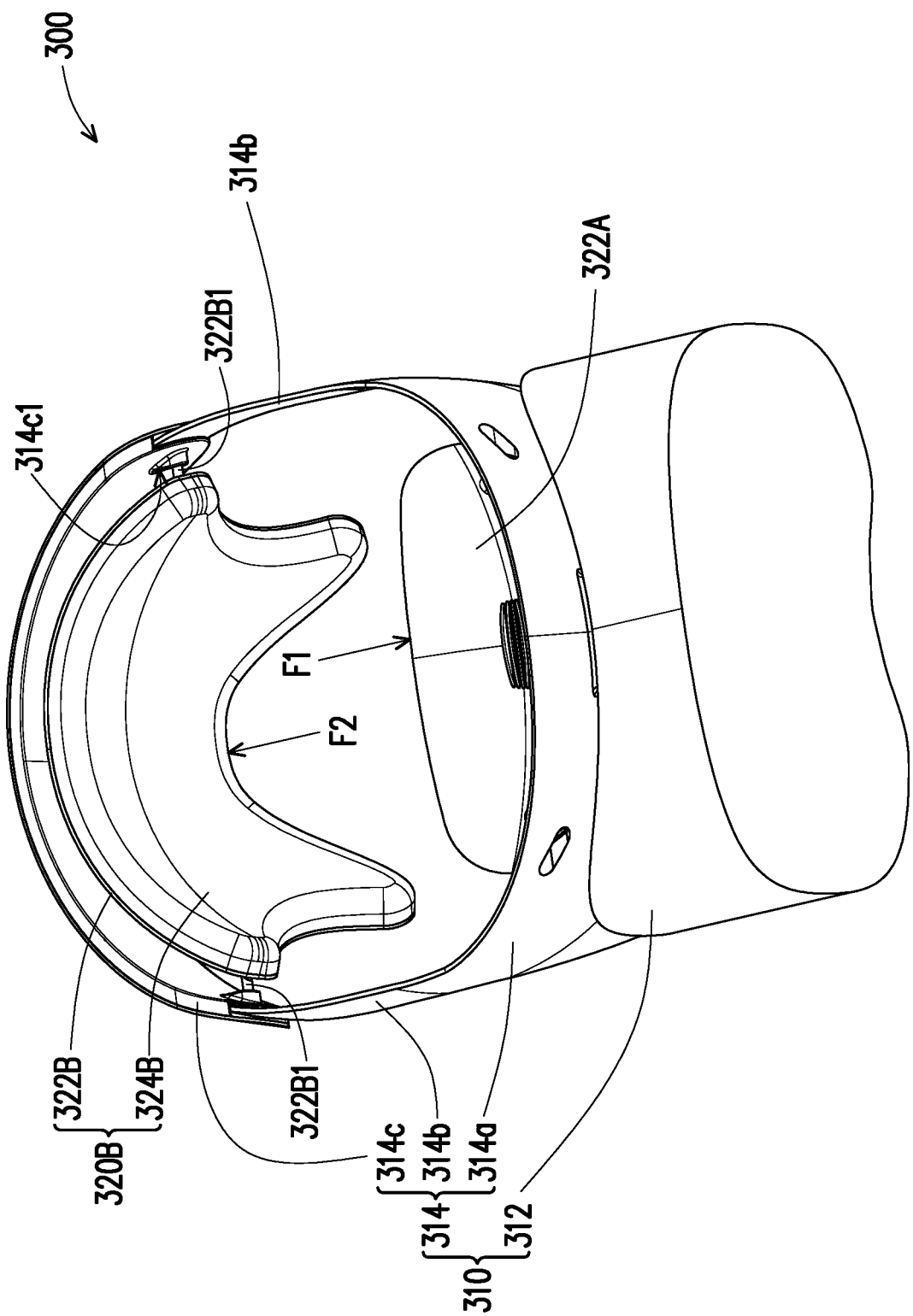
FIG. 7B is a schematic three-dimensional view of the head-mounted display device of FIG. 7A in another viewing angle.
Figure 8A:
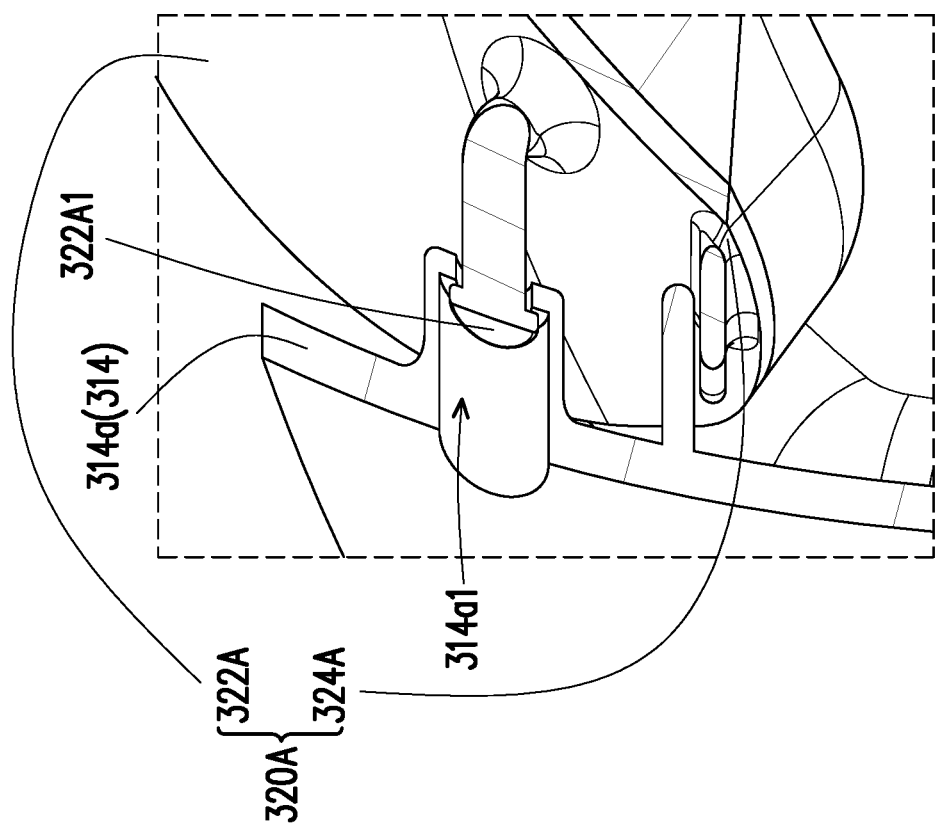
FIG. 8A is a schematic partial cross-sectional view of the head-mounted display device of FIG. 7A.
Figure 8B:
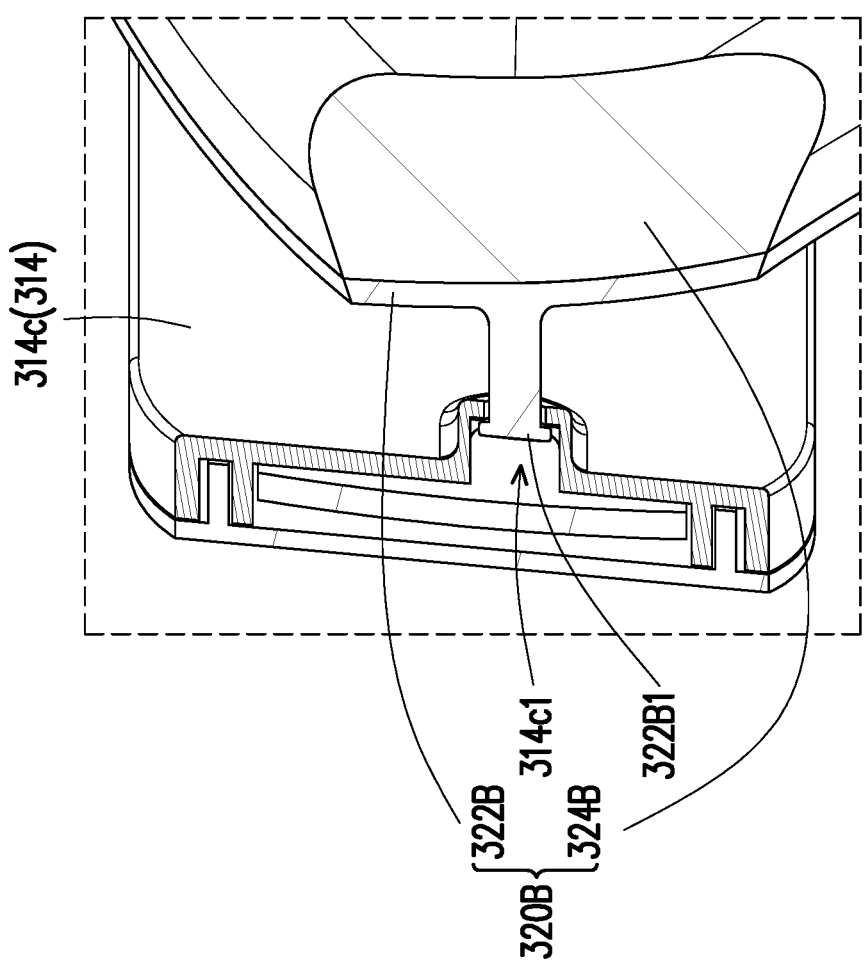
FIG. 8B is a schematic partial cross-sectional view the head-mounted display device of FIG. 7B.

FIG. 7A is a schematic three-dimensional view of a head-mounted display device according to another embodiment of the application. FIG. 7B is a schematic three-dimensional view of the head-mounted display device of FIG. 7A in another viewing angle. FIG. 8A is a schematic partial cross-sectional view of the head-mounted display device of FIG. 7A. FIG. 8B is a schematic partial cross-sectional view the head-mounted display device of FIG. 7B. Referring to FIG. 7A to FIG. 8B, the head-mounted display device 300 includes a wearable assembly 310, a first cushion 320A, a second cushion 320B and at least one adjustable fixing assembly. In the head-mounted display device 300 of the embodiment, implementation of the at least one adjustable fixing assembly is the same to that of the first adjustable fixing assembly 130A and the second adjustable fixing assembly 130B of the head-mounted display device 100, and detail thereof is not repeated.

In detail, the wearable assembly 310 includes a main body 312 and a headband assembly 314 connected to the main body 312. The headband assembly 314 includes an eye contact portion 314a capable of covering the two eyes of the user, a pair of extension portions 314b respectively connected to two opposite ends of the eye contact portion 314a, and a rotation mechanism 314c coupled to the pair of extension portions 314b. The rotation mechanism 314c is adapted to rotate and drive the pair of extension portions 314b to tighten or loosen, so as to increase or decrease a total length of the pair of extension portions 314b.

On the other hand, the eye contact portion 214a has a pair of first sliding channels 314a1. The first cushion 320A includes a first support portion 322A and a first buffer portion 324A connected to the first support portion 322A. The first support portion 322A includes a pair of first sliding portions 322A1 corresponding to the pair of first sliding channels 314a1, and the pair of first sliding portions 322A1 are movably disposed in the pair of first sliding channels 314a1. The first buffer portion 324A is configured to contact the frontal bone of the user.

The rotation mechanism 314c has a pair of second sliding channels 314c1. The second cushion 320B includes a second support portion 322B and a second buffer portion 324B connected to the second support portion 322B. The second support portion 322B includes a pair of second sliding portions 322B1 corresponding to the pair of second sliding channels 314c1, and the pair of second sliding portions 322B1 are movably disposed in the pair of second sliding channels 314c1, and the second sliding portions 322B1 are, for example, columnar structures, but not limited thereto. The second buffer portion 324B is configured to contact the occipital bone of the user.

In summary, in the head-mounted display device of the application, the wearable assembly is adapted to be worn on the head of the user, the cushions are floatingly connected to the wearable assembly, and when the first positioning structure and the second positioning structure are structurally interfered to position the cushions to the wearable assembly, the upper sides and the lower sides of the cushions may contact the head of the user at the same time, so that the cushions may be matched to the head shapes of the users, which avails the user more stably wearing the head-mounted display device on the head, and improving comfort of the user wearing the head-mounted display device.

Although the application has been disclosed by the above embodiments, they are not intended to limit the application. It is apparent to one of ordinary skill in the art that modifications and variations to the application may be made without departing from the spirit and scope of the application. Accordingly, the protection scope of the application will be defined by the appended claims.

What is claimed is:

1. A head-mounted display device, comprising:
    a wearable assembly, adapted to be worn on a head of a user;
    at least one cushion, adapted to contact the head of the user, and floatingly connected to the wearable assembly; and
    at least one adjustable fixing assembly, comprising a first positioning structure and a second positioning structure,
    wherein the first positioning structure is connected to the wearable assembly, the second positioning structure is connected to the at least one cushion, and a structural interference generated between the first positioning structure and the second positioning structure positions the at least one cushion to the wearable assembly,
    wherein the wearable assembly has at least one pair of sliding channels, the at least one cushion has at least one pair of sliding portions corresponding to the at least one pair of sliding channels, the pair of sliding portions are located at two opposite ends of the at least one cushion, and the pair of sliding portions are respectively movably disposed in the pair of sliding channels.

2. The head-mounted display device as claimed in claim 1, wherein the at least one cushion is subjected to an external force to drive the second positioning structure to move towards the first positioning structure relative to the wearable assembly, and when the second positioning structure and the first positioning structure generate the structural interference, the structural interference generated between the first positioning structure and the second positioning structure positions the at least one cushion to the wearable assembly.

3. The head-mounted display device as claimed in claim 2, wherein the at least one cushion is subjected to the external force to drive the second positioning structure to move towards the first positioning structure relative to the wearable assembly, and two opposite ends of the at least one cushion are adapted to translate towards each other under the external force, and the at least one cushion is adapted to drive the second positioning structure to rotate relative to the wearable assembly under the external force.

4. The head-mounted display device as claimed in claim 2, wherein the first positioning structure comprises a first interference portion, the second positioning structure comprises a plurality of second interference portions, and when the at least one cushion is subjected to the external force to drive the second positioning structure to move relative to the wearable assembly and rotate relative to the wearable assembly, and the first interference portion is moved between two adjacent second interference portions to make the second positioning structure to engage with the first positioning structure, a mutual engagement between the first positioning structure and the second positioning structure positions the at least one cushion to the wearable assembly.

5. The head-mounted display device as claimed in claim 2, wherein the first positioning structure comprises a rough surface, the second positioning structure comprises another rough surface corresponding to the first positioning structure, and when the at least one cushion is subjected to the external force to drive the second positioning structure to move towards the first positioning structure relative to the wearable assembly and rotate relative to the wearable assembly to make the second positioning structure and the first positioning structure to contact each other, friction generated between the first positioning structure and the second positioning structure positions the at least one cushion to the wearable assembly.

6. The head-mounted display device as claimed in claim 1, wherein the pair of sliding portions are spherical structures.

7. The head-mounted display device as claimed in claim 1, wherein the wearable assembly comprises:
a main body, adapted to project display images towards two eyes of the user; and
a headband assembly, connected to the main body, and adapted to be worn on the head of the user, wherein the headband assembly comprises:
an eye contact portion, adapted to cover the two eyes of the user;
a pair of extension portions, respectively connected to two opposite ends of the eye contact portion; and
a rotation mechanism, coupled to the pair of extension portions, and adapted to rotate to drive the pair of extension portions to tighten or loosen, so as to adjust a total length of the pair of extension portions.

8. The head-mounted display device as claimed in claim 7, wherein the eye contact portion has a pair of the at least one pair of sliding channels.

9. The head-mounted display device as claimed in claim 8, wherein the cushion is adapted to contact a frontal bone of the user, and has an upper side and a lower side opposite to each other, wherein when the headband assembly is worn on the head of the user, the upper side contacts the frontal bone of the user, and when the cushion is subjected to an external force to drive the second positioning structure to move towards the first positioning structure relative to the eye contact portion and rotate relative to the eye contact portion to make the first positioning structure and the second positioning structure to generate the structural interference to position the cushion to the eye contact portion, the upper side and the lower side contact the frontal bone of the user.

10. The head-mounted display device as claimed in claim 7, wherein the rotation mechanism has a pair of the at least one pair of sliding channels.

11. The head-mounted display device as claimed in claim 10, wherein the cushion is adapted to contact an occipital bone of the user, and has an upper side and a lower side opposite to each other, wherein when the headband assembly is worn on the head of the user, the lower side contacts the occipital bone of the user, and when the cushion is subjected to an external force to drive the second positioning structure to move towards the first positioning structure relative to the rotation mechanism and rotate relative to the rotation mechanism to make the first positioning structure and the second positioning structure to generate the structural interference to position the cushion to the rotation mechanism, the lower side and the upper side contact the occipital bone of the user.

12. The head-mounted display device as claimed in claim 7, wherein the at least one cushion comprises a first cushion and a second cushion, wherein the at least one pair of sliding channels comprises a pair of first sliding channels and a pair of second sliding channels, and the at least one pair of sliding portions comprises a pair of first sliding portions and a pair of second sliding portions, the eye contact portion has the pair of first sliding channels, the rotation mechanism has the pair of second sliding channels, the first cushion has the pair of first sliding portions corresponding to the pair of first sliding channels, the pair of first sliding portions are located at two opposite ends of the first cushion, the second cushion has the pair of second sliding portions corresponding to the pair of second sliding channels, the pair of second sliding portions are located at two opposite ends of the second cushion, the pair of first sliding portions are respectively movably disposed in the pair of first sliding channels, and the pair of second sliding portions are respectively movably disposed in the pair of second sliding channels.

13. The head-mounted display device as claimed in claim 12, wherein the at least one adjustable fixing assembly comprises a first adjustable fixing assembly and a second adjustable fixing assembly, the first adjustable fixing assembly comprises the first positioning structure and the second positioning structure, the first positioning structure is connected to the eye contact portion, the second positioning structure is connected to the first cushion, the second adjustable fixing assembly comprises a third positioning structure and a fourth positioning structure, the third positioning structure is connected to the rotation mechanism, and the fourth positioning structure is connected to the second cushion.

14. The head-mounted display device as claimed in claim 13, wherein the first cushion is adapted to contact a frontal bone of the user, and has a first upper side and a first lower side opposite to each other, the second cushion is adapted to contact an occipital bone of the user, and has a second lower side and a second upper side opposite to each other, wherein when the headband assembly is worn on the head of the user, the first upper side contacts the frontal bone of the user, the second lower side contacts the occipital bone of the user, and when the first cushion is subjected to a first external force to drive the second positioning structure to move towards the first positioning structure relative to the eye contact portion and rotate relative to the eye contact portion to make the first positioning structure and the second positioning structure to generate the structural interference to position the first cushion to the eye contact portion, the first upper side and the first lower side contact the frontal bone of the user, and when the second cushion is subjected to a second external force to drive the fourth positioning structure to move towards the third positioning structure relative to the rotation mechanism and rotate relative to the rotation mechanism to make the third positioning structure and the fourth positioning structure to generate a structural interference to position the second cushion to the rotation mechanism, the second lower side and the second upper side contact the occipital bone of the user.

* * * * *